United States Patent [19]
Erichsen

[11] 3,896,425
[45] July 22, 1975

[54] PROXIMITY DETECTOR
[75] Inventor: Herman W. Erichsen, Medfield, Mass.
[73] Assignee: Tyco Laboratories, Inc., Waltham, Mass.
[22] Filed: Oct. 16, 1973
[21] Appl. No.: 406,866

[52] U.S. Cl. ........ 340/258 B; 340/267 R; 343/5 PD; 343/832
[51] Int. Cl. ............................................. G08b 13/24
[58] Field of Search ......... 343/5 PD, 832, 840, 742; 340/258 B, 258 C, 267 R; 325/357; 330/68

[56] References Cited
UNITED STATES PATENTS

| | | | |
|---|---|---|---|
| 2,137,278 | 11/1938 | George et al. | 330/68 |
| 2,170,050 | 8/1939 | Gandtner | 325/357 |
| 2,479,337 | 8/1949 | Fyler | 343/742 |
| 2,557,994 | 6/1951 | Ostlund | 343/832 |
| 2,972,145 | 2/1961 | Watts, Jr. | 343/742 |
| 3,100,282 | 8/1963 | Fletcher | 330/68 |
| 3,196,364 | 7/1965 | Latham, Jr. | 325/357 |
| 3,739,392 | 6/1973 | Ross et al. | 343/840 |
| 3,744,044 | 7/1973 | Vosteen | 340/267 R |

Primary Examiner—Maynard R. Wilbur
Assistant Examiner—G. E. Montone
Attorney, Agent, or Firm—Schiller & Pandiscio

[57] ABSTRACT

An improved electrical proximity detector device which includes antenna means for providing an electric field, means for shielding the antenna means, means for driving the antenna and shielding means so as to establish said field, and means for detecting a change in the field caused by a foreign body into the field.

9 Claims, 10 Drawing Figures

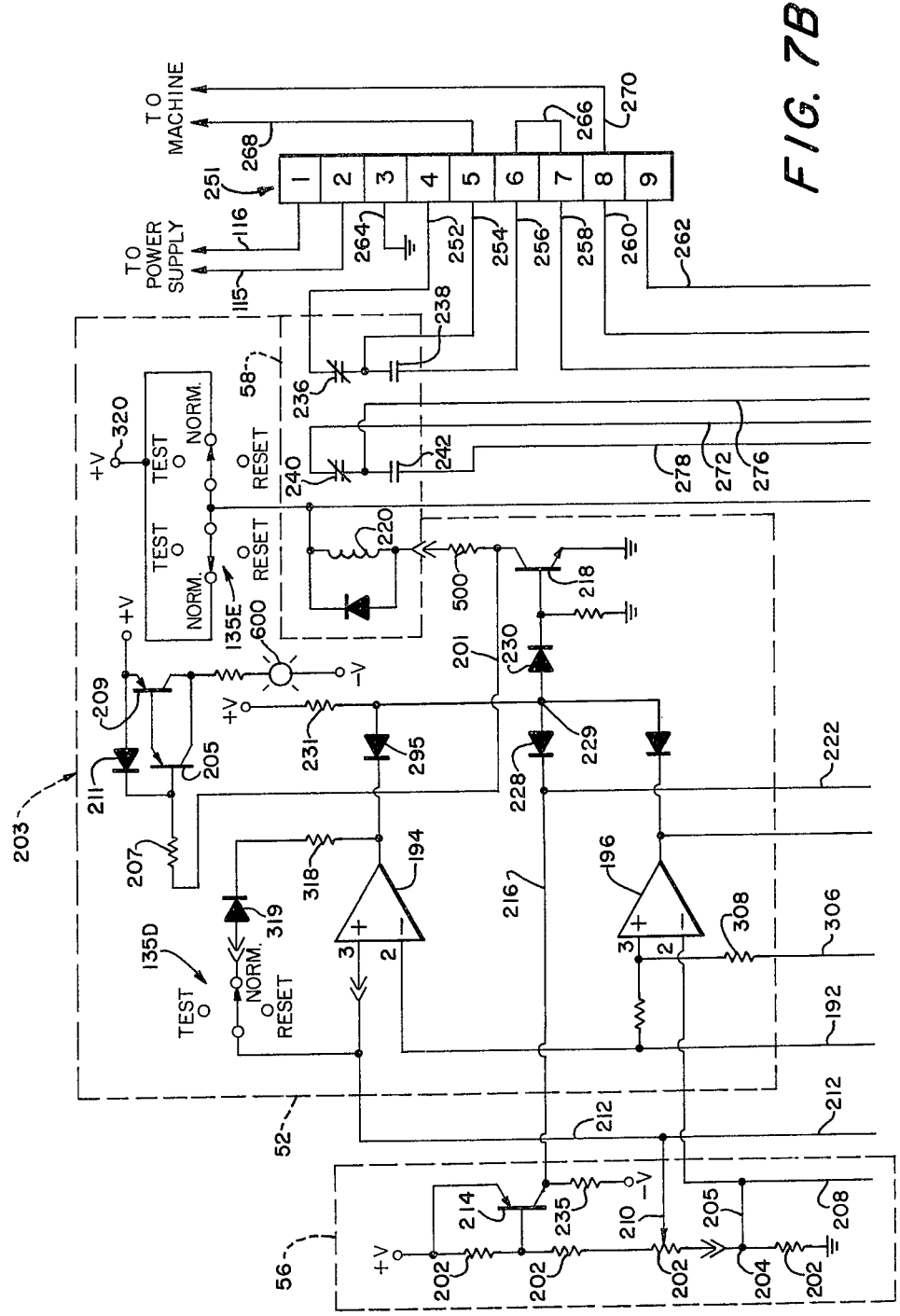

PROXIMITY DETECTOR

This invention relates to an improved electrical proximity detector device and more particularly to a more sensitive proximity detector device having a shield antenna.

Proximity detectors have been used for some time to detect the entrance of an object into a protected area. Such devices are commonly used in conjunction with heavy machinery such as stamping presses, whereby the insertion of the operator's hand into an area where it may be injured by the machine is immediately sensed and machine operation promptly stopped. One type of proximity detector device to which the present invention is directed utilizes an electrical conductor of aluminum or the like, sometimes referred to an an antenna, extending around the area to be protected. The antenna which may be one unitary piece or assembly of pieces is energized by a low power radio frequency source and a detector is provided to detect a change in capacitance or a change in the field produced by intrusion of a foreign object into the region of the antenna. A control system coupled to the detector acts to terminate machine operation when intrusion of a foreign body is detected.

A problem arises when the detector is used to protect an operator of heavy machinery. Under normal conditions, the field created by the antenna tends to be unduly affected by a person coming close to the antenna, with the result that the control system may be triggered to terminate machine operation even though no intrusion of the protected area has occured. Thus, if the operator moves in the area of the antenna, the large capacitance presented by his body may cause a change in the ambient capacitance which is sensed by the detector, and the change in such capacitance may be great enough to cause the system to stop the operation of the machinery even though the operator is not in danger of being injured.

To minimize this problem, it has been proposed to surround a portion of the antenna with a grounded shield arranged to effectively limit the electric field so that the system will not respond merely to proximity of the operator's body to the antenna. However, introduction of a grounded shield in the area of the field has several drawbacks.

One drawback arises from the fact that the grounded shield adds capacitance to the antenna system, thus limiting the length of the antenna that may be used. It is well known that the capacitance introduced by an antenna system is dependent on the latter's length, i.e., the longer the antenna system, the more capacitance. Since the device operates to detect a change in capacitance in the area of the antenna, the antenna system must be designed so as not to exceed some maximum value of capacitance; otherwise the device will not be sufficiently sensitive. Hence, the length of the antenna must be kept within certain limits. Although this increased capacitance effect could be offset by increasing amplifier gain, this is not desirable since increasing the gain of the amplifier tends to introduce amplifier stability problems. A second drawback of a grounded shield is that it has the effect of desensitizing the antenna by the presence of more capacitance. A third problem arises from the physical assembly of the antenna and grounded shield. If the shield is mounted too close to the antenna, a "hole" may occur in the field in the protected area, in which case an object could pass through the hole without being detected.

Accordingly, the primary object of the present invention is to provide an improved proximity detector device which overcomes the aforementioned problems.

Another object of the present invention is to provide an improved proximity detector system of the character described which provides an electric field in the protected area that is shaped so that the system can discriminate between intrusion of the field by an object and mere nearness of a non-intruding object.

A further object of the present invention is to provide an improved proximity detector which has substantially uniform sensitivity to intruding objects throughout a protected area.

The foregoing and other objects are achieved by a proximity detector device of the character described having a grounded shield and a driven shield interposed between the antenna and the operator.

Other features and many of the attendant advantages of the invention are described or rendered obvious by the following detailed description which is to be considered together with the accompanying drawings wherein:

FIGS. 7A–D are detailed circuit diagrams of the preferred embodiment of the inventioin.

In the drawings, like numerals refer to like parts.

Figure 1:
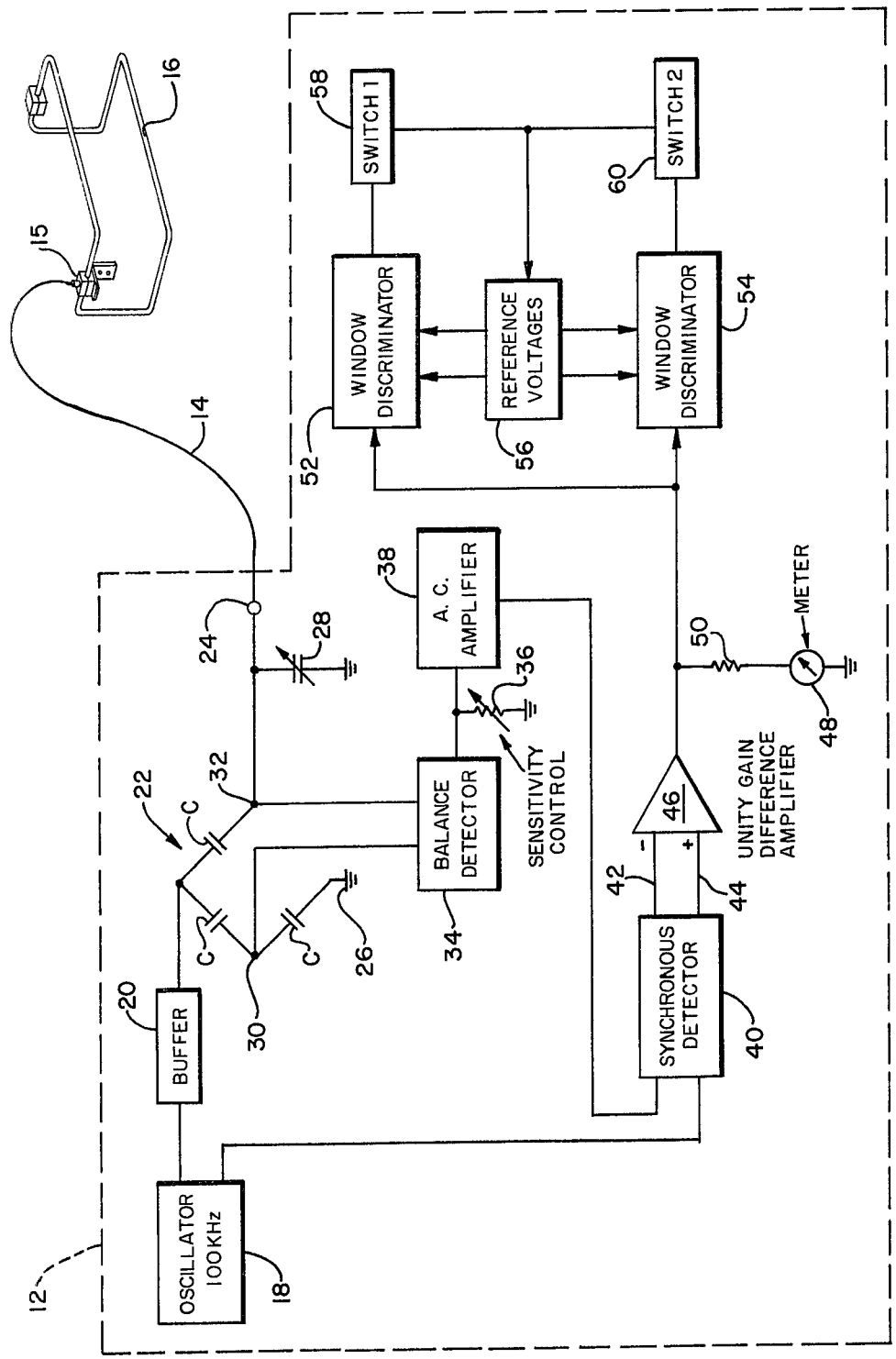
FIG. 1 is an overall block diagram of an embodiment of a known proximity detector device to which the invention is directed.

Referring to the drawings, FIG. 1 illustrates a proximity detector and machine safety control system which is known in the prior art.

This prior art system comprises a control unit 12 connected by a coaxial cable 14 to an antenna 16. Control unit 12 is commonly mounted in a security cabinet (not shown) which houses all the active components of the control unit. The control unit comprises an oscillator 18 which provides a low power radio frequency signal. By way of example, the frequency of the signal can be approximately 100 KHz. Oscillator 18 is connected through a buffer 20 to a capacitance bridge 22. Antenna 16 is connected to one arm of the bridge through the coaxial cable 14 and a terminal 24. The capacitance of this arm may be varied through adjustment of a variable capacitor 28. An AC signal representative of the bridge unbalance is developed across bridge terminals 30 and 32 and this is applied to the two input terminals of a balance detector 34. The balance detector 34 performs the important function of providing an AC signal proportional to the degree of bridge unbalance. The output of the balance detector is adjusted by a variable resistor 36. This output is applied through an AC amplifier 38 to one input terminal of a demodulator or synchronous detector 40. The second input terminal of demodulator 40 is connected directly to an output terminal at oscillator 18. Two DC signals, each corresponding to the bridge unbalance but acting opposite to each other, are developed on the output leads 42 and 44 of the demodulator 40 and these DC signals are applied to the two inputs of a differential amplifier 46. The DC output of the latter is connected to a milliammeter 48 through a current limiting resistor 50. The DC signal is also supplied to the inputs of two identical window discriminators 52 and 54. The windows are in turn coupled to a pair of machine control switches 58 and 60 so that the switches are controlled respectively by the output signals from the windows 52 and 54. Each of the switches 58 and 60 may be any electrically controlled switch, such as a transistor or relay and can be independently operated or may be wired together to form a single control in a manner more fully described hereinafter in connection with the improved device. Each window is provided with maximum and minimum limits so that should the signal from the differential amplifier 46 rise above the maximum window limit or fall below the minimum window limit, the machine controlled by the device is immediately stopped. The limit values for the windows are derived from a reference voltage source 56.

The antenna 16 of the prior art is formed of conductive hollow tubing which is connected together in a closed loop. The design and shape of the loop is generally determined by the shape and location of the protected area. Antenna 16 is usually mounted to the machine to be installed by means of a suitable insulator brackets 15 which is electrically insulate it from ground and from the machine and any surrounding structure.

Figure 2:
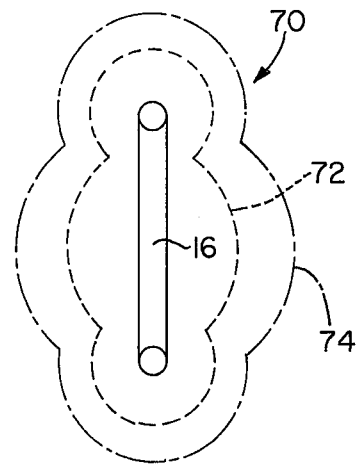
FIG. 2 is a cross-sectional view of the antenna of FIG. 1 illustrating the electric field provided under unshielded normal operating conditions.

FIG. 2 illustrates the electric field 70 which is provided by the antenna 16 of prior art device of FIG. 1 when it is energized by the power source in control unit 12. Where the device is used to protect the operator of heavy machinery, two areas of the field 70 become of interest. Broken line 72 shows generally the boundary of the field 70 which is sensitive to the operator's hand. When the operator's hand crosses dotted line 72, the capacitance presented by the hand will be sufficient to be sensed in order to stop the machine. However, the operator's body will present an even larger capacitance. As a result, as shown by broken line 74, the area of the field 70 which will sense the body sufficiently to stop the machine will be more extensive than the area indicated by dotted line 72.

Figure 3:
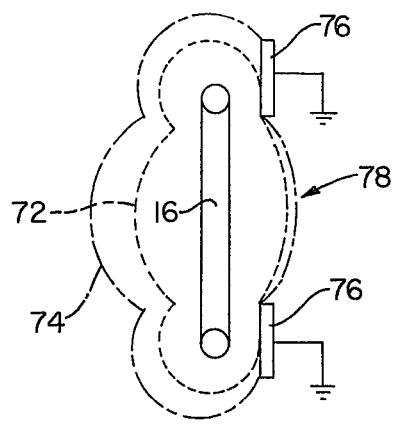
FIG. 3 is a cross-sectional view of the antenna of FIG. 1 illustrating the effects of a grounded shield on the electric field.

As well known in the prior art, FIG. 3 shows the effects on the electric field of placing a grounded shield 76 in front of the antenna 16. As shown at 78, field lines 72 and 74 are much closer to one another in the area of the shield. This will allow the operator to move around in front of the machine without triggering the stop signal. However, as previously mentioned, the grounded shield alone is not satisfactory since it (a) increases the capacitance of the antenna system, thereby limiting the length of the antenna that can be used, and (b) it tends to desensitize the antenna so that there may be a "hole" in the protected area. The term "hole" is employed to describe a low sensitivity region in the area to be protected.

Figure 4:
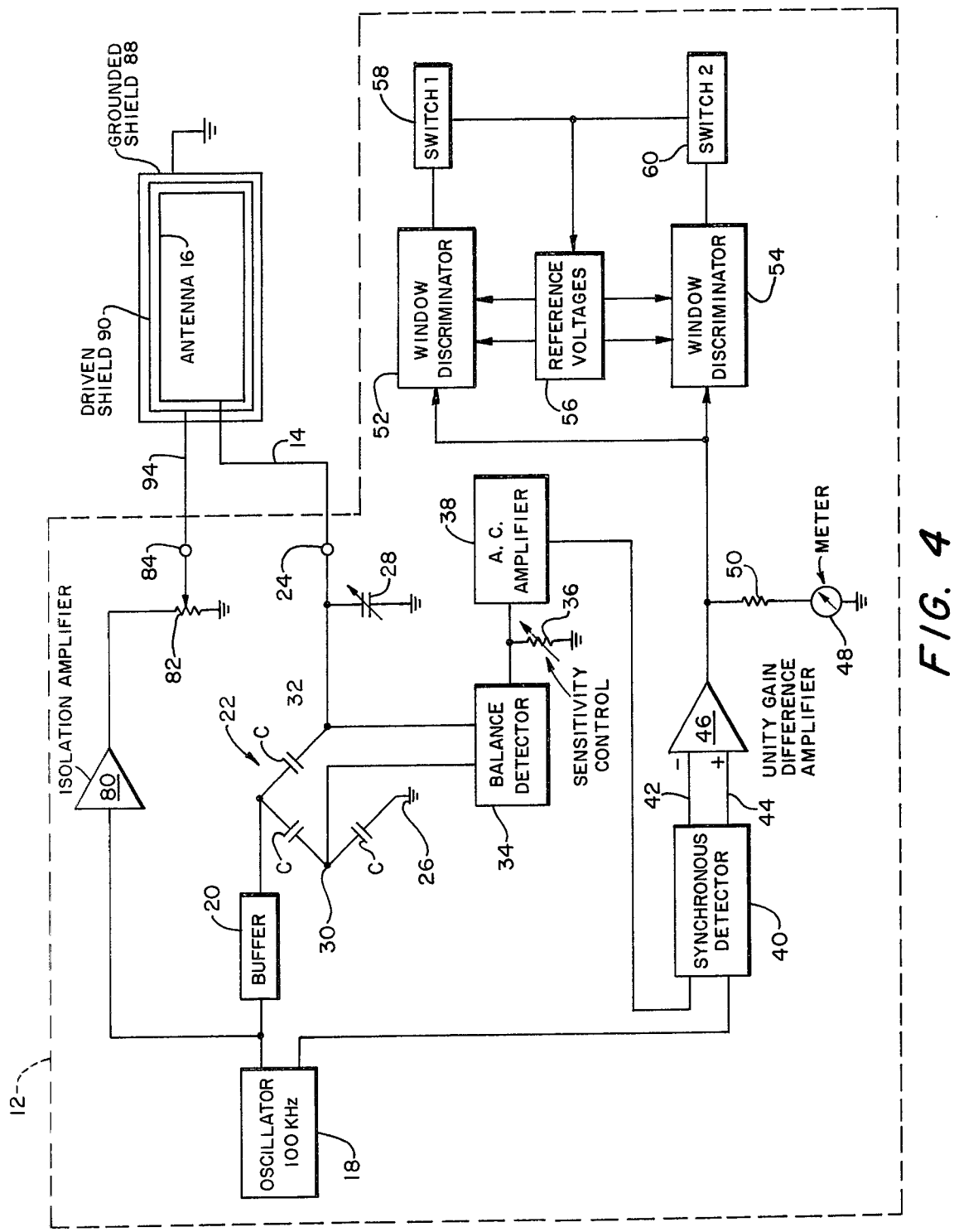
FIG. 4 is an overall block diagram of a preferred embodiment of the present invention.

FIG. 4 illustrates an embodiment of the invention which overcomes the above-mentioned disadvantages of the prior art. In this case the control unit 12 is modified to include an isolation amplifier 80. The latter is shown as driven by the oscillator 18. In the alternative, although not shown, it may be driven by the output at the bridge terminal 32. The output of the amplifier is applied through a sensitivity control 82 to an output terminal 84. Output terminal 84 is connected through a coaxial cable 94 to a driven shield 90. In this way oscillator 18 drives both antenna 16 and shield 90. Antenna 16 and shield 90 are driven by signals which are at the same frequency and in phase with one another. It has been found that the best results are achieved when antenna 16 is also driven at the same amplitude as the signal that drives shield 90. If only a driven shield is employed with antenna 16, the operator's potential may rise above ground toward the level of potential of the driven shield. This results in the device being less sensitive. It has been discovered that the sensitivity can be improved by the use of a grounded shield in addition to the driven shield. It is preferable, therefore, to interpose a grounded shield such as shown at 88 between the driven shield 90 and antenna 16.

Figure 6:
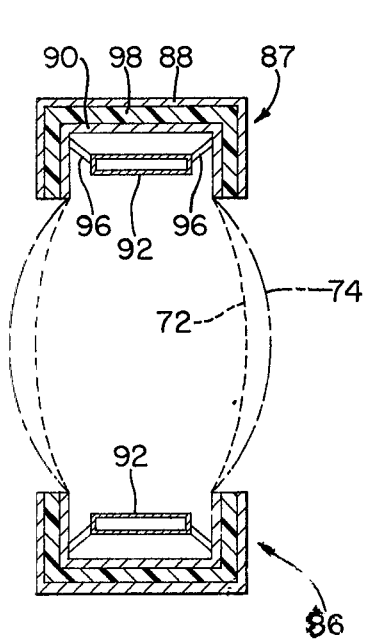
FIG. 6 is a cross-sectional side view taken along line 6—6 of FIG. 5 illustrating the electric field.
Figure 5:
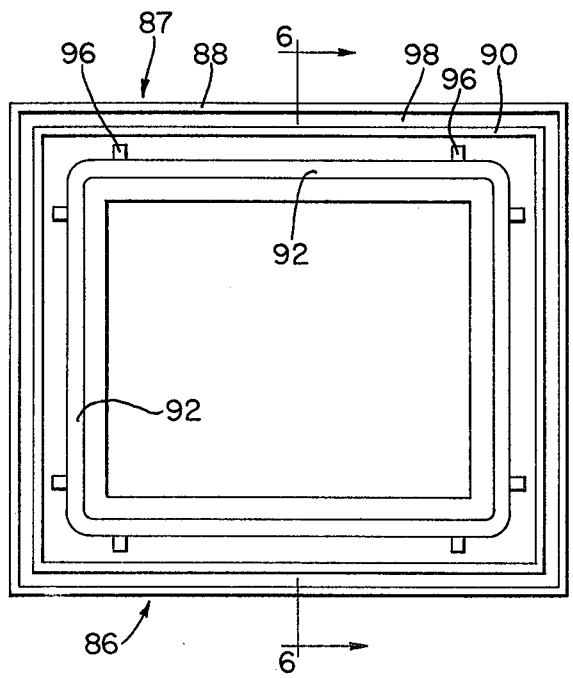
FIG. 5 is a cross-sectional view of an antenna and shield assembly designed in accordance with the invention.

FIGS. 5 and 6 illustrate a detailed embodiment of the improved antenna and shield assembly employed in the system of FIG. 4. Referring now to FIGS. 5 and 6, there is shown an antenna and shield assembly which comprises an antenna means 92 mounted in a shield assembly 87 by means of a support 96. Antenna means 92 may be formed of thin-wall conduit (EMT) having a wall thickness of 1/16 inch. While antenna means 92 is illustrated as a conduit having a rectangular cross-section, it is understood that the conduit may be of a different cross-section and may take a variety of shapes and sizes. The only requirement is that the total capacitance of the antenna and shield assembly and the coaxial cables which connect it to unit 12 (i.e., cables 14 and 94 in FIG. 4) not exceed some predetermined maximum capacitance value, which will be more apparent hereinafter. Support means 96 are designed to maintain antenna means 92 in a fixed relationship with and insulated from shield assembly 87. Accordingly, support means 96 may be of any shape and are preferably made of an insulating dielectric material, such materials being well known in the art.

Shield assembly 87 comprises driven shield 90 and grounded shield 88 separated by an insulating layer 98. The driven shield 90 and grounded shield 88 are both preferably made of metal, the latter being electrically connected to the surrounding machine structure so that it is properly grounded. The insulating layer 98 is provided to separate driven shield 90 from ground shield 88. Insulating layer 98 can be made of any material which will not transmit signals of a frequency in the range transmitted by the antenna and shield. Such materials include various dielectric materials which are well known in the art. Preferably, as a matter of convenience and economic efficiency, the shields 88 and 90 and the insulating layer 98 are made as a single laminated unit.

Referring to FIG. 6, it can be seen that the addition of the shield assembly 87, with both the antenna means 92 and the shield 90 being driven by control unit 12, has the effect of improving the pattern of the electromagnetic field so that the area of the field which is sensitive to the operator's body (the area represented by broken lines 74) is more nearly the same as the area of the field which is sensitive to the operator's hand (the area represented by broken line 72). Additionally the protected area has no hole and hence the system is capable of detecting intrusion of a hand or other subject into any section of the protected area defined by the antenna means.

Figure 7A:
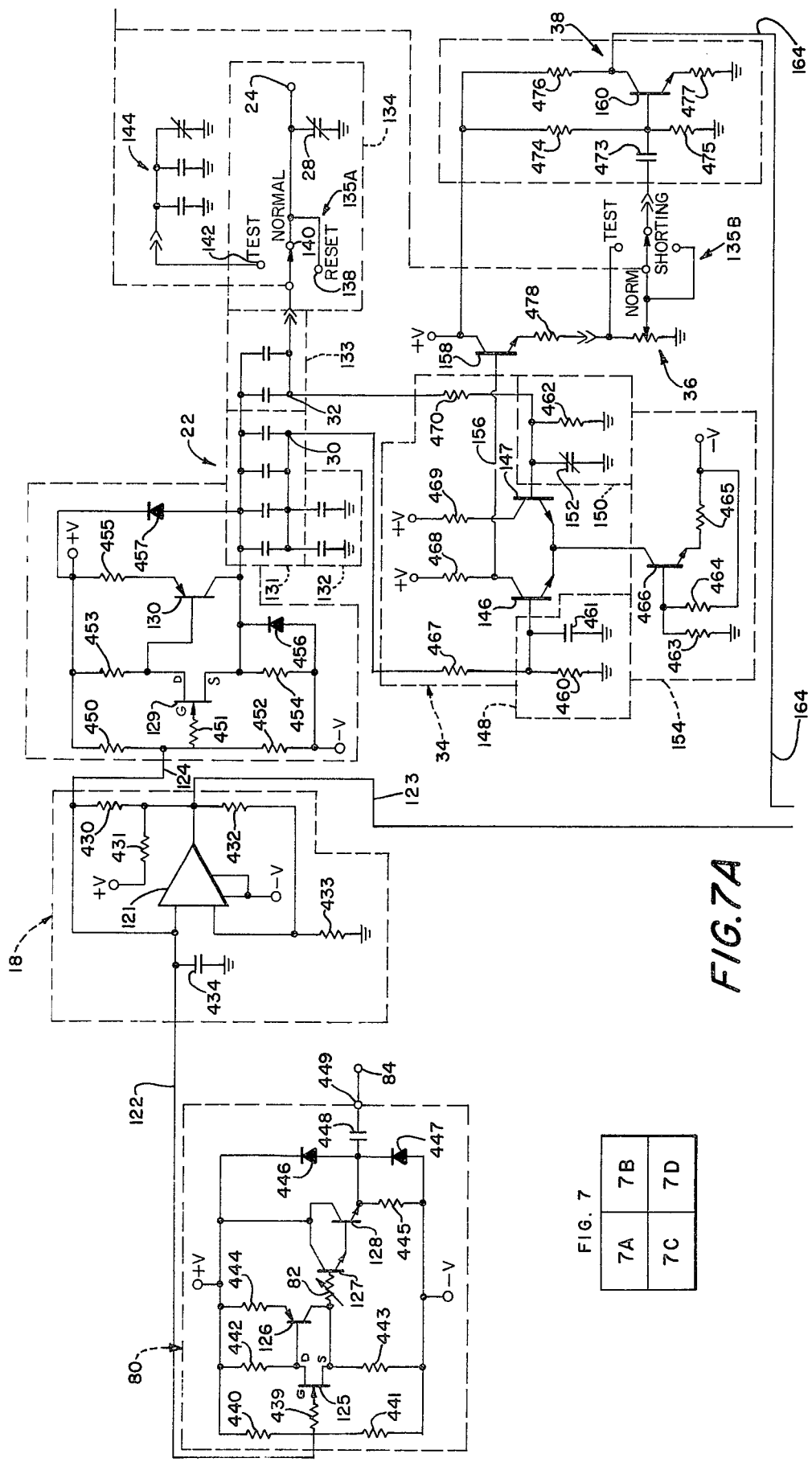

Oscillator 18 which is also well known in the prior art is shown in FIG. 7A as including a feedback amplifier 121, feedback resistors 430 and 432, biasing resistors 431 and 433 and charging capacitor 434. Biasing resistors 431 and 433 are connected to positive and negative d.c. voltage sources adapted to provide equal but opposite biasing voltages, eg., +15 and −15 volts. Amplifier 121 and resistors 430–433 are connected to form a free-running multivibrator in order to provide a triangular wave-shaped output on leads 122 and 124 and a square-wave output on lead 123 of the same frequency as the first mentioned output.

Lead 122 is connected to the input of the isolation amplifier 80, the latter being well known in the art. Lead 122 is connected through a resistor 439 to the gate of an FET 125, the gate of the latter being biased by a voltage divider consisting of resistors 440 and 441 connected between suitable positive and negative d.c. voltage sources. The source of FET is biased by resistor 443 while the drain is biased by resistor 442. The drain is connected to the base of a transistor 126. The emitter of transistor 126 is biased by resistor 444. Transistor 126 is cascaded through the sensitivity control 82 with transistors 127 and 128, the emitter of the latter being biased by resistor 445, to form a three stage amplifier as well known in the art. Rectifying diodes 446 and 447 are provided to protect against excessive voltages. A filtering capacitor 448 is provided so that a signal will be provided at output 449. Output 449 is connected to terminal 84. Terminal 84 is connected to one end of the coaxial cable 94 that is attached to shield 90 as previously described.

Figure 7C:
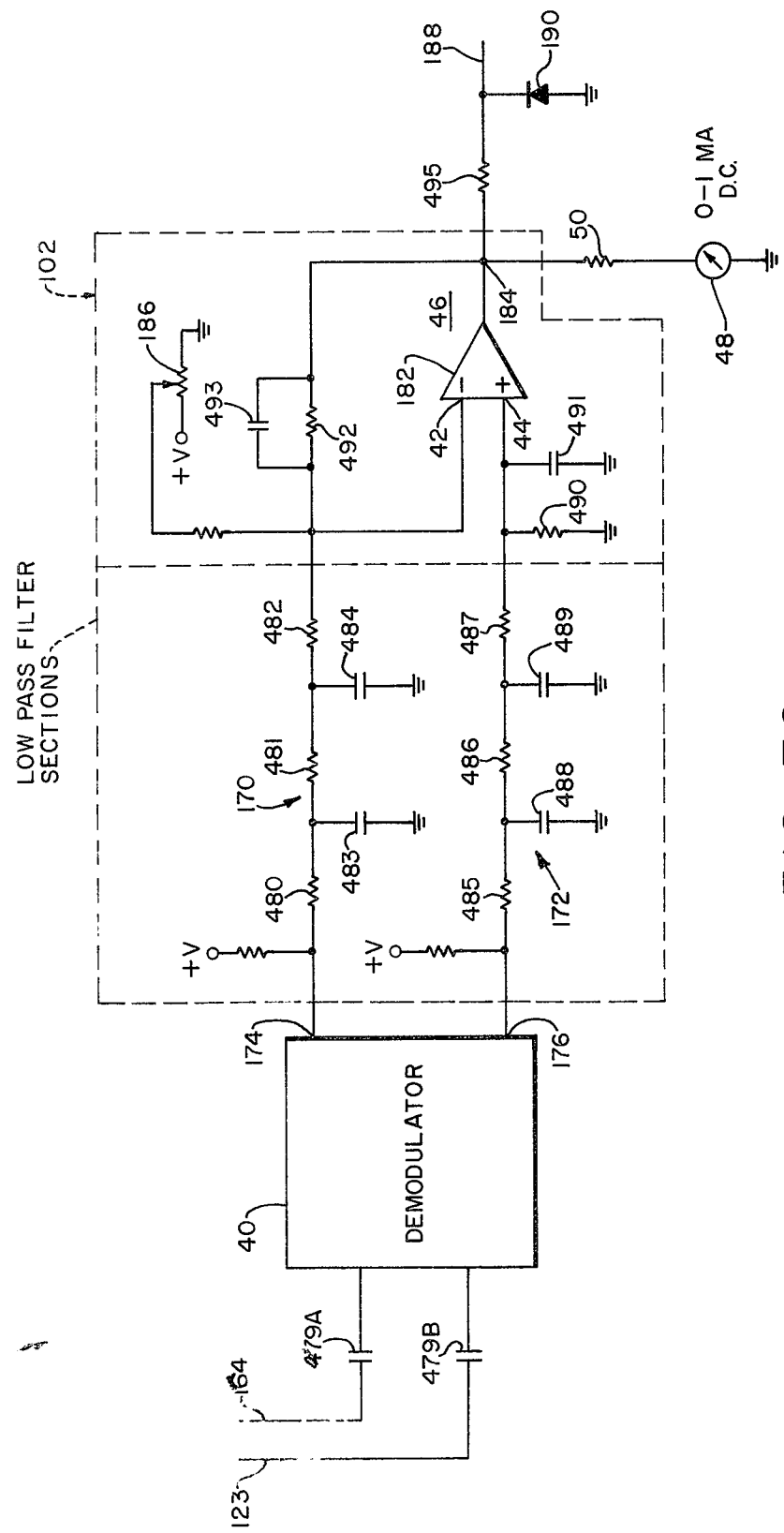

Lead 123 is connected to one input terminal of demodulator 40 (shown) in FIG. 7C). Lead 124 is connected to buffer 20. Lead 124 is connected through resistor 451 to the gate of an FET 129, the gate being biased by a voltage divider consisting of resistors 450 and 452 which are connected between suitable positive and negative d.c. voltage sources. The source of FET 129 is biased by resistor 451 while its drain is biased by resistor 453. The drain is connected to the base of a transistor 130, the emitter of the latter being biased by resistor 455. Rectifying diodes 456 and 457 are connected as shown in order to protect against excessive voltages and so that a signal will be provided at the output of the buffer. The output of the buffer is connected to the capacitive bridge 22, which comprises the three capacitive arms 131, 132 and 133. The fourth arm of the bridge is formed by the coaxial cable 14 and the antenna means 92 to which it is connected through terminal 24 (as shown in FIG. 4). This fourth arm is generally indicated at 134 and also includes the variable capacitor 28. The fourth arm 134 of the bridge is connectable to the remainder of the bridge circuit through a multiple contact switch 135A. This switch has three stationary contacts 138, 140 and 142 identified as RESET, NORMAL, and TEST respectively, plus a movable contact which is coupled to the capacitive arm 133. Test contact 142 is coupled to a group of TEST capacitors 144 which are used for checking the remainder of the circuit. The output terminals 30 and 32 of the bridge are connected respectively to the two input sections of a known balance detector 34. These input sections consist of resistors 467 and 470 which are connected respectively to phase shifting circuits 148 and 150. The former includes a resistor 460 in parallel with a capacitor 461, while the latter includes a variable capacitor 152 in parallel with a resistor 462. The outputs of circuits 148 and 150 are connected respectively to the bases of transistors 146 and 147. The collectors of the latter are connected respectively to suitable positive d.c. voltage sources via biasing resistors 468 and 469, while the emitters are tied together to the output of a constant current source 154. Source 154 comprises a transistor 466 which is properly biased by resistors 463 and 465 and biasing resistor 464 to provide the constant current to the emitters of transistors 146 and 147. Resistors 464 and 465 are connected to a suitable negative d.c. voltage source as shown.

The output lead 156 from the balance detector is attached from the collector of transistor 146 to the base of a transistor 158, the latter acting as a buffer. The collector of transistor 158 is properly biased as shown and the emitter is connected by a resistor 478 to a sensitivity adjustment potentiometer 36. Potentiometer 36 determines the biasing level of the voltage signal transmitted therethrough. The output of amplifier 158 is applied through a second multiple contact switch 135B to a known AC amplifier 38. Switch 135B is identical to and is ganged for operation with switch 135A. Its three stationary contacts are identified as TEST, NORMAL, and SHORTING. The latter contact and also the movable contact of switch 135B are connected to the slider of potentiometer 36. The TEST contact is coupled between resistor 478 and potentiometer 36 as shown. The NORMAL contact of switch 135B is connected through a filtering capacitor 473 to the base of transistor 160 that forms part of amplifier 38. The base of transistor 160 is biased by a voltage divider comprising resistors 474 and 475 connected to the same voltage source as the collector of transistor 158. The emitter of transistor 160 is biased by resistor 477 while the collector is biased by resistor 476. The output line 164 of the amplifier 38 is connected from the collector of transistor 160 to a filtering capacitor 479A that is coupled to one input terminal 166 of demodulator 40 as shown in FIG. 7C. The other input 168 of the demodulator is connected by a capacitor 479B and to the squarewave output from oscillator 18 as previously described. The demodulator 40 is well known in the art and will not be described in detail. By way of example only, the demodulator may be of the type commercially available from Fairchild model 796.

Still referring to FIG. 7C, a pair of low pass filter sections 170 and 172 respectively comprising resistors 480–482 and capacitors 483 and 484, and resistors 485–487 and capacitors 488 and 489, are connected to the two outputs 174 and 176 of the demodulator 40 and operate with the demodulator in a well known manner to produce DC signals at the respective inputs 42 and 44 of the differential amplifier 46. The latter includes biasing resistor 490 and filtering capacitor 491, an operational amplifier 182 and feedback resistor and capacitor 492 and 493. The inputs at 42 and 44 of the differential amplifier are DC signals, each corresponding to the bridge unbalance but acting opposite to each other so that the output appearing at output terminal 184 of the amplifier is a DC signal equal in magnitude to the difference between the DC signals at input terminals 42 and 44. The magnitude of this output signal is indicated by milliammeter 48 connected in series with a current limiting resistor 50 across the amplifier output and which, by way of example only, may have a display range of from 0 to 1 milliamp. The input terminal 42 of amplifier 46 is also connected through a potentiometer 186 to a suitable positive DC voltage source as shown so that the potentiometer forms a bias or offset control for differential amplifier 46, the purpose of which is to adjust the DC signal level on output terminal 184 to a level appropriate for the degree of unbalance in the bridge circuit 22.

The output terminal 184 is connected through a resistor 495 to output lead 188. Connected across this lead is a rectifier diode 190. Rectifier diode 190 is poled so that the DC potential on output lead 188 can never go negative more than approximately ½ volt DC.

Figure 7D:
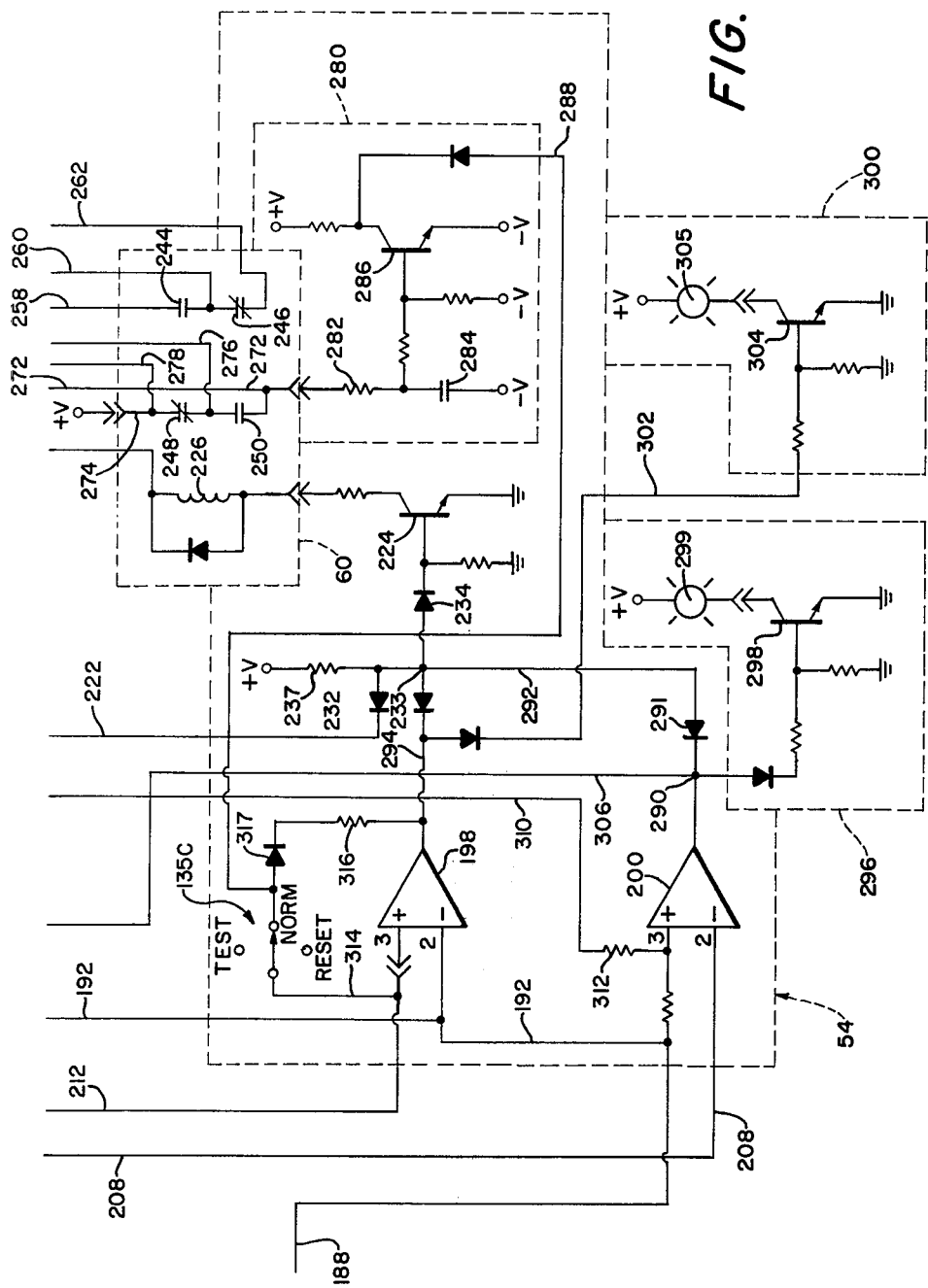

Referring to FIGS. 7B and 7D, the DC voltage level on output lead 188 is applied by this lead and a second lead 192 to the window discriminators 52 and 54. The two windows are of identical construction. The first window 52 (shown in FIG. 7B) is formed by a pair of differential amplifiers 194 and 196. Amplifiers 194 and 196 respectively determine the maximum and minimum voltage level which will be passed by window 52. These maximum and minimum voltage levels are referred to as the upper and lower cutoff values, respectively. Similarly, window 54 (shown in FIG. 7D) is formed by a pair of differential amplifiers 198 and 200. Amplifier 198 determines the upper cutoff value and amplifier 200 determines the lower cutoff value. These maximum and minimum limits are determined by the reference voltage source 56 (FIGS. 4 and 7B) which comprises a series of resistors 202 connected as shown between a positive DC voltage source and ground. The lower cutoff voltage level which is fixed, is taken off from the series-connected resistors at the tap 204 and is applied by leads 206 and 208 to the negative (−) input terminals of each differential amplifier 196 and 200. The upper cutoff voltage level is taken from the tap of potentiometer 210 and is applied by lead 212 to the positive (+) input terminal of each amplifier 194 and 198. This upper cutoff level is controlled by potentiometer 210.

The two windows are of identical construction and are set to have identical maximum and minimum voltage limit levels. This redundancy in the circuit is provided to insure proper operation of the device and to make certain that a malfunction in the circuit will be indicated and will act to shutdown the machine being protected. As an additional safety feature, the circuit of FIGS. 7A-D incorporates in the reference voltage circuit 56 in FIG. 7B a protective junction transistor 214. During normal operation, this transistor is turned on and is conducting. However, should a break occur in the series resistance network and particularly should a break occur between taps 204 and 210 where it might not otherwise be detected, the resulting high potential or increased potential at the base of transistor 214 will turn that transistor off. The collector of transistor 214 is connected by lead 216 through diode 228 to point 229 (FIG. 7B). Point 229 is in turn connected through diode 230 with the base of a transistor switch 218. The collector of transistor 218 is connected through resistor 500 with the operating solenoid coil 220 of relay switch 58. The collector of transistor 214 is also connected by lead 222 through diode 232 (FIG. 7D) to point 233. Point 233 is in turn connected through diode 234 with the base of a transistor switch 224 in series with the operating coil 226 of relay switch 60. During normal operation, transistors 218 and 224 are turned on by the high potential at their bases and current flows through the relay coils to energize the coils. When transistor 214 switches off, the lower potential appearing at the collector of this transistor allows current to flow from the positive DC voltage source through resistor 231, diode 228 and resistor 235 to the negative DC source. Resistors 231 and 235 are such that point 229 will then have a negative potential and transistor switch 218 will turn off. In a similar fashion, point 233 will have a negative potential when transistor 214 switches off because of the current flowing through resistor switch 224 to turn off also. Under this condition, the series circuit through the relay coils is broken and the coils are deenergized to stop the equipment to which the device is attached.

Referring to FIG. 7B, the relay switch 58 comprises a first pair of contacts, referred to as the machine control contacts, which consist of normally closed contacts 236 and normally open contacts 238. The normally open and normally closed conditions for the contacts illustrated in the drawings will prevail when the respective relay coils are unenergized. In addition, relay switch 58 comprises a second pair of contacts, referred to as the monitor contacts, again consisting of a normally closed pair of contacts 240 and a pair of normally open contacts 242. The machine control contacts 236 and 238 are mechanically ganged internally of the relay with the monitor contacts 240 and 242 so that monitor contacts mechanically follow the condition of machine control contacts. Relay switch 60 is of identical construction and comprises normally open and normally closed machine control contact sets 244 and 246 and the corresponding monitor contacts 248 and 250. In the same manner, contacts 248 and 250 mechanically follow the condition of contacts 244 and 246. Contacts 236 and 238 of relay switch 58 are connected to a terminal block 251, by leads 252, 254, and 256. Similarly, machine control contacts 244 and 246 are connected to the terminal block 251 by leads 258, 260, and 262. The relay leads are connected to respective terminals numbered 4–9 of the terminal block. Terminal 3 of the block is connected to ground, as indicated at 264, while terminals 1 and 2 of the terminal block are connected by leads 115 and 116 to a conventional 60 Ha, 117 volt power supply outlet. Relay switches 58 and 60 may be operated independently or may be connected in series as illustrated by connecting an external jumper 266 (FIG. 7B) across terminals 6 and 7 and connecting terminals 5 and 8 of the terminal block in series in the energizing circuit of the machine or other electrical device to be controlled by way of leads 268 and 270. The relays are of conventional construction and, by way of example only, may be of the type commercially available from Potter & Brumfield model KRP11DG.

The purpose of the monitor contacts in the relay switches 58 and 60 is to make certain that the two relays work together, i.e., that their machine control contacts open and close at the same time. For this purpose, the normally closed contacts 240 and 248 of the monitor sets are connected together and to the positive side of the power supply by leads 272 and 274. The midpoints between the normally open and normally closed monitor sets are interconnected by lead 276 and the normally open contacts are coupled (as shown) to lead 278 and to a relay safety circuit, generally indicated at 280 in FIG. 7D. This circuit comprises a charging resistor 282, a charging capacitor 284, and a feedback transistor 286. As long as both relays 58 and 60 are in the same position or condition, no circuit is completed to the charging capacitor 284 from power supply lead 274 through the monitor contacts. However, if the relays 58 and 60 assume different positions or conditions, a circuit can be traced through the monitor contacts of both relays from the positive side of the power supply thru lead 274 to the negative side of the power supply through charging capacitor 284. If this difference in condition between the relay contacts persists for a sufficient length of time, capacitor 284 charges up through resistor 282, turning on transistor 286 which, in turn, supplies a feedback signal over lead 288 which acts to deenergize the relays and the machine being protected in a manner more fully described below.

As previously indicated, differential amplifier 200 determines the minimum cutoff for the lower window 54. That is, it establishes the minimum potential on output lead 188 which will maintain the relay coils energized. If the output voltage level on lead 188 applied to the positive input terminal of amplifier 200 is above the reference level at the negative input terminal of this amplifier, then the voltage level at the amplifier output 290 is some positive DC value. With a positive output value at output 290, there will be no current flowing through resistor 237 and diode 291 and the potential at point 233 remains positive. If the voltage level at the positive input terminal of the amplifier falls below the reference level at its negative input terminal, then the output at 290 goes negative. With output 290 a negative DC value, current will flow through resistor 237 and diode 291 and the potential at point 233 will also drop to a negative value. With point 233 at a minus potential, current will not be able to flow through diode 234 to the base of switching transistor 224 and switching transistor 224 will turn off and deenergize relay 60. The operation of low cutoff amplifier 196 of the upper window 52 is the same since the inputs of the two amplifiers are interconnected by leads 192 and 208.

Output lead 290 from amplifier 200 is also connected by a lead 306 and a feedback resistor 308 to the positive input terminal of lower cutoff amplifier 196 of the upper window 52. This connection is provided to insure that the relays work together at the lower cutoff value. That is, when the lower cutoff is exceeded, i.e., when the potential on lead 188 falls below the reference level at the negative input terminal of amplifier 200, lead 290 goes from a positive to a negative DC voltage. The minus potential is applied through the feedback resistor 308 to the positive input terminal of amplifier 196, causing this terminal to go slightly negative with respect to the negative input terminal of amplifier 196 so that the output of the latter also switches from positive to negative. A similar feedback crosscoupling from this amplifier back to amplifier 200 is provided by lead 310 and feedback resistor 312 so that if the output of amplifier 196 when the output falls below the low cutoff valve is the first to go negative, this is applied through feedback resistor 312 to amplifier 200, causing its output to also go rapidly negative.

In the upper cutoff amplifier, such as the amplifiers 194 and 198, the reference and signal input terminals are reversed. That is, the upper reference DC voltage level is applied over lead 212 to the positive input terminals of the upper cutoff amplifiers 194 and 198. Considering amplifier 198, for example, if the voltage level from lead 188 applied by way of lead 192 to the negative input terminal of the amplifier is below the reference level at the positive input terminal, then the output from this amplifier on lead 294 is positive, maintaining the relay energized in a manner similar to the method with which the relay is maintained energized when output 290 is at a positive DC value. If the output level on lead 188 exceeds the reference level, then output lead 294 goes negative and the relays are deenergized, again in a manner similar to the method with which the relay is deenergized when the output at 290 is at a negative DC value.

Still referring to FIG. 7D, the line 294 is connected through a feedback resistor 316 and a diode 317 to a stationary contact, identified as NORMAL, of a third multiple contact switch 135C. The other two stationary contacts of switch 135C are identified as TEST and RESET. The movable contact of switch 135C, which is ganged to operate with the corresponding elements of switches 135A and 135B, is connected to the positive input terminal of amplifier 198 and through lead 212 to the corresponding input terminal of amplifier 194. When line 294 of amplifier 198 is positive, diode 317 is biased off and the voltage level at the positive input terminals of both amplifiers 198 and 194 is unaffected by the feedback circuit. When the output on line 294 goes negative, the positive input terminals of amplifiers 198 and 194 will go rather heavily negative as diode 317 is biased on. In a similar manner (see FIG. 7B), the feedback circuit, consisting of resistor 318, diode 319 and a fourth multiple contact switch 135D, will also cause the voltage on lead 212 and the positive input terminals of amplifiers 194 and 198 to go negative as the voltage on output 295 of amplifier 194 goes negative. Switch 135D is ganged for operation with switches 135A-C. The operation of amplifier 194 of the upper window is essentially the same as the operation of amplifier 198. As previously shown and described in FIG. 7C, diode 190 will not allow the DC voltage on leads 188 and 192 to go negative more than approximately ½ volt. Once negative potentials on the outputs of amplifiers 194 and 198 have made the signals on the positive input terminals of amplifiers 194 and 198 heavily negative, it is impossible to bring the voltage levels on the negative input terminals of amplifiers 194 and 198 negative enough to switch the outputs 294 and 295 back to a positive voltage. The feedback signal on lead 288 from RC safety circuit 280 operates in a somewhat similar fashion. During normal operation, transistor 286 is turned off and lead 288 is at a relatively high potential. When capacitor 284 charges, transistor 286 becomes conductive and the potential on lead 288 goes negative. This negative potential is fed back over lead 288 and another lead 314, through the third contact 135C to the positive input terminal of upper cutoff amplifier 198, thus switching the outputs 294 and 295 to a negative value. These feedback circuits through the switch contacts insure that once the relays have been deenergized by the upper cutoff amplifiers 194 and 198, they cannot be reenergized until the switch is moved both to the RESET postion and returned to the NORMAL position. That is, the relays cannot be reenergized until the feedback circuits are broken by movement of the multiple contact switch to the RESET postion and then reclosure of the switch.

In all cases, a positive output potential on the output leads of all four window amplifiers 194, 196, 198 and 200 is required to maintain the relays energized. If the output from any one of these amplifiers goes negative, both relays are deenergized by turning off the switching transistors 218 and 224. The output 290 of low limit amplifier 200 is connected to a light driver circuit, generally indicated at 296, comprising a switching transistor 298 and low limit cutoff lamp 299 (see FIG. 7D). The positive output on lead 290 indicating normal operation is applied to the base of transistor 298 maintaining this transistor conducting and the lamp 299 energized. When the output on lead 290 goes negative, transistor 298 is switched off and the light 299 goes out. A similar upper cutoff light driver circuit 300 is connected by lead 302 to the output 294 from upper cutoff amplifier 198. This circuit includes switching transistor 304 and upper cutoff light or lamp 305. As long as the output from the amplifier on lead 294 is positive, transistor 304 is conducting and light 305 is on. When the output from amplifier 198 goes negative, transistor 304 is cut off and light 305 is extinguished.

Referring now to FIG. 7B, a fifth multiple contact switch 135E is provided to disconnect the switches 58 and 60 from the positive power supply terminal 320 for the switches when the multiple switch contact is in either the TEST or the RESET position. Switch 135E is ganged for operation with switches 135A-D. Connected to the collector of transistor 218 by lead 201 is a light driver circuit, generally indicated at 203, which drives light 600. The purpose of light 600 is to indicate when the switching transistors 218 and 224 have been turned on and have energized the relay coils 226 and 220. When the voltage applied to the base of transistor 205 through lead 201 (biased by a positive potential through diode 211) and resistor 207 is close to ground potential, as it is when transistor 218 is turned on, the transistors 205 and 209 in the circuit will be switched on and current will flow from the positive volt supply of the power supply to the negative voltage supply, turning light 600 on. When transistor switch 218 is turned off deenergizing relay 58, the voltage on lead 201 will rise to a positive level. This positive voltage is reflected through lead 201 and resistor 207 to the transistors 205 and 209 turning these transistors off and thus turning the light 600 off.

In practice, the antenna and shield assembly 86 are securely mounted on the machine and checked to insure proper clearance throughout the machine cycle. Whenever possible, this should be done without powering the machine. The control cabinet is securely mounted in its permanent location and 117 volt, 60 Hz AC power is connected to the terminals so marked and a secure and positive connection provided between the ground terminal and the frame of the machine. The relay contact terminals are connected to the machine control circuit. The coaxial cables are then installed between the antenna and shield assembly 86 and the control unit 12 and its connectors securely tightened.

When making adjustments, the machine must be in the inoperative condition. During normal operation, both the upper cutoff and lower cutoff indicator lamps 305 and 299 are illuminated and machine shutdown occurs if either of the indicator lamps is extinguished. The lower cutoff indicator lamp is extinguished by an increase in sensor circuit capacitance produced when the operator's hand or any foreign object intruding into the protected region. The upper cutoff indicator is extinguished by a decrease in sensor circuit capacitance caused by loss of (or faulty connection to) a portion of the antenna assembly or by a failure of the cable or connectors between the antenna and the control unit. The contacts of relays 58 and 60 are brought out independently to permit either a circuit closure or a circuit opening to stop the machine. If the machine circuitry requires that the control circuit be open to stop the machine, both open contacts should be wired in series with the machine control circuit. Conversely, if the machine circuitry requires that the control circuit be closed to stop the machine, both closed contacts should be connected in parallel with the machine control circuit connected across them. The upper cutoff light is extinguished if the antenna cable is damaged or disconnected or if the antenna becomes displaced or damaged. A machine shutdown due to any of these causes requires that after the defect is remedied, the manual RESET of the multiple contact switches 135A-E must be performed before the system is again operative. The lower cutoff light is extinguished when any foreign object intrudes into the protected area, also causing machine shutdown. However, this circuit is self-restoring and the indicator lamp will again illuminate when the cause of the shutdown is removed, restoring the operative condition. Machine operation and the sensing system operation cannot be restored by holding the switch in the RESET position and because of this safety feature, the system cannot be intentionally defeated.

Rotating the multiple contact switches 135A-E to the TEST position disconnects the antenna system from the control unit and substitutes a preset capacitance. The meter indication is used to verify that the antenna and shield capacitance and the TEST capacitance both produce the desired condition in the system.

It should be noted that during normal operation the bridge is deliberately out of balance so that an output is produced and a potential of between the minimum cutoff and the maximum cutoff appears on lead 188. Thus, should power supply potential fail, the relays are automatically deenergized.

It is apparent from the above that the present invention provides an improved safety device or proximity sensor or detector for sensing the presence of a foreign object, such as an operator's hand, tool or the like.

The improved antenna assembly provides an electric field which is shaped so as to improve discrimination between intrusion of the field by an object and mere nearness of a non-intruding object. In this connection it is to be appreciated that the antenna need not necessarily be shaped as a closed loop and have a rectangular cross-section, or is it necessary that the shield assembly shield the entire antenna and have a U-shaped cross-section. Thus, for example, the antenna may be a linear straight conduit or it may be U-shaped. The antenna may have a cross sectional shape which is oval, circular, square, triangular, etc. Further, by way of example, the shield assembly may shield only the front of the antenna and have an L-shaped cross section. The system also has other advantages. Thus, external power failure, accidental breakage or disconnection of the antenna and shield assembly, relay or internal malfunction causes the unit to shut down in a safe position and the dual output relays are constantly monitored internally for proper operation. When the machine to which the system is attached is operating, the system must also be in operation or it will shut down the machine. The machine will not stop unless a part of the operator intrudes the field provided by the antenna and shield assembly. Removing or disconnecting the antenna assembly does not defeat the control.

The invention may be embodied in other specific forms without departing from the spirit or essential characteristics thereof. In this connection it is to be understood that the two inputs to detector or demodulator 40 need not be respectively triangular and square wave signals as described above. In the instant case the particular shape of the input signals is determined by where they are obtained from oscillator 18. In practice, the wave forms of the two inputs of the demodulator may or may not have the same wave form; however, they must have the same frequency in order for the detector to operate in a synchronous mode. The present embodiment is, therefore, to be considered in all respects as illustrative and not restrictive, the scope of the invention being indicated by the appended claims rather than by the foregiong description, and all changes which come within the meaning and range of equivalency of the claims are, therefore, intended to be embraced therein.

What is claimed is:

1. A variable capacitance protective device for sensing changes in the contents of a defined sensitive volume comprising:
   a conductive member shaped to enclose at least part of said sensitive volume;
   means for exciting said conductive member with alternating electrical energy in order to provide an electric field;
   a first grounded shield surrounding a portion of said conductive member for selectively limiting the direction of said field with respect to said sensitive volume;
   a second shield interposed between said first shield and said conductive member;
   means for exciting said seond shield with alternating electrical energy having the same frequency and phase as the energy exciting said conductive member so as to change the capacitance between said conductive member and said first shield; and
   means for sensing a change in said field.

2. A protective device in accordance with claim 1, further including electrical insulation between said first and second shields.

3. A protective device in accordance with claim 2 wherein said first and second shields are laminated to said electrical insulation to form a shield assembly.

4. A protective device in accordance with claim 3 wherein said shield assembly is substantially U-shaped in cross-section, and said conductive member is located within said shield assembly.

5. A protective device in accordance with claim 4 further including means for mounting said conductive member to said second shield.

6. A protective device in accordance with claim 5 wherein said conductive member is made of thin-walled conduit and said conductive member and said shield assembly are shaped to define a closed loop and wherein said sensing means senses changes in said electric field in the proximity of said closed loop.

7. A protective device in accordance with claim 1, wherein said field sensing means comprises a capacitive balancing circuit and means for coupling said conductive member electrically into said balancing circuit.

8. A device for sensing changes in the contents of a defined sensitive volume comprising:
   an electric field sensitive system including a conductive element extending in at least two directions and shaped so as to at least partially define said sensitive volume; means for applying an alternating electrical potential to said conductive element so that said element produces an electric field; a first conductive shield surrounding a portion of said conductive element, said first shield being grounded; a second conductive shield disposed between said conductive element and said first shield, and surrounding a portion of said conductive element; and means for applying an alternating electrical potential to said second shield with said second potential varying at the same frequency and in phase with said first potential, so that the capacitance between said conductive element and said first shield is changed by the presence of said second shield;
   and
   means connected to said conductive element for sensing changes in said field produced by the introduction of a conductive body into said sensitive volume.

9. A protective device comprising:
   a conductive member located adjacent an area to be protected;
   first shielding means for confining the electric field provided by said conductive member to the area to be protected;
   second shielding means for changing the capacitance between said conductive member and said first shield means;
   means coupling said second shielding means for exciting said shielding means with alternating electrical energy at a preselected frequency;
   a capacitance balancing circuit;
   means coupling said conductive member electrically into said balancing circuit;
   means coupled to said balancing circuit for exciting said circuit with alternating electrical energy at said preselected frequency and in phase with the energy exciting said second shielding means;
   detector means coupled to said balancing circuit for producing a D.C. output indicative of unbalance in said balancing circuit;
   a pair of electrical window discriminators having maximum limits coupled to the output of said detector means; and
   a pair of switches coupled to said windows for actuation when the maximum or minimum limit of either window discriminators is exceeded by the output of said detector means.

* * * * *